Sept. 1, 1959 C. P. KOLTHOFF, JR 2,902,298
FLEXIBLE TUBE CONNECTOR WITH INTERNAL
RESILIENT SECURING MEANS
Filed Dec. 10, 1956
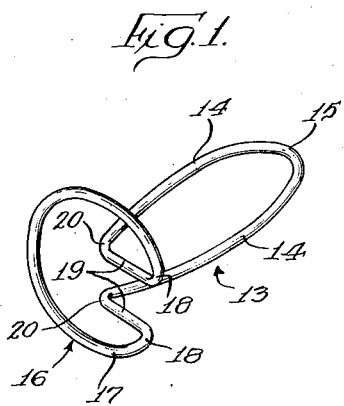
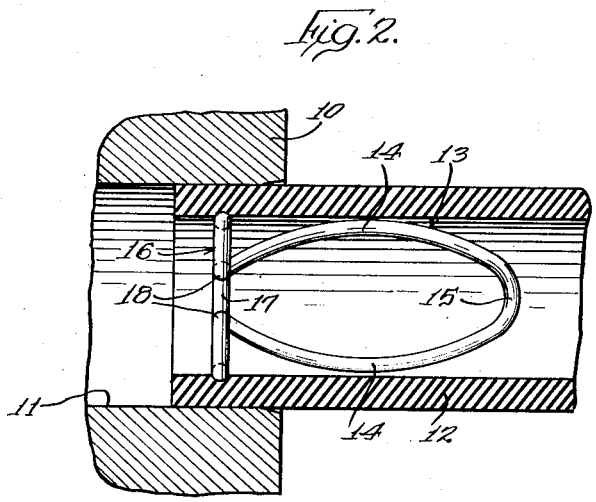
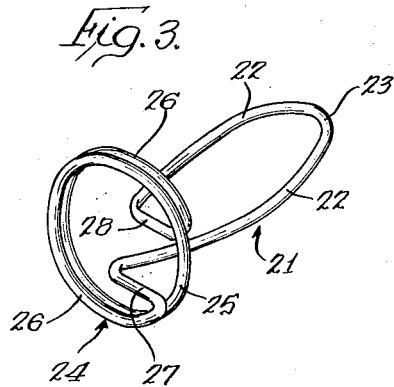
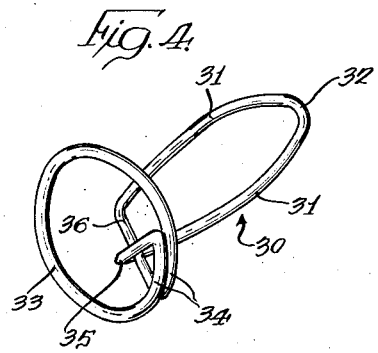
INVENTOR.
C. Paul Kolthoff, Jr.
BY
Atty:

United States Patent Office 2,902,298
Patented Sept. 1, 1959

2,902,298

FLEXIBLE TUBE CONNECTOR WITH INTERNAL RESILIENT SECURING MEANS

C. Paul Kolthoff, Jr., Naperville, Ill., assignor to International Harvester Company, a corporation of New Jersey Application December 10, 1956, Serial No. 627,307

1 Claim. (Cl. 285—239)

This invention relates to flexible tube connectors and more particularly to connector elements for connecting flexible tubing to a bore.

A prime object of this invention is to provide an improved connector element for connecting the end of a flexible tube to an internal bore whereby the said flexible tube is held in sealing in communicating relation with respect to the bore.

A still further object is to provide a simplified connector element for flexible tubing ends, the said element being adapted to quickly attach and detach a flexible tube to the bore of a casing or similar member.

A still further object is to provide a spring type of tube connector comprising an expansible spring-like element adapted to be inserted in the end portion of a flexible tube for connecting the same to a bore.

A still further object of the invention is to provide a wire like expander of a certain configuration designed to fit in the interior portion of a flexible tube and to expand the same against the inner wall of a bore for effecting sealed communication with said bore.

These and other objects will become more readily apparent from a reading of the description when examined in connection with the accompanying sheet of drawings.

In the drawings:

Figure 1 is a perspective view of a connector element adapted to be positioned in the end portion of a tube for suitably expanding the same against the inner wall of a bore;

Figure 2 is a cross-sectional view through a casing member having a bore showing a flexible tube end in communication with the bore and in sealed engagement with respect thereto by means of an improved connector element;

Figure 3 is a perspective view of a modified connector element; and

Figure 4 is a perspective view of another form of modified connector element.

Referring now particularly to Figures 1 and 2, a member or casing 10 generally comprises a bore or passage 11, the said bore 11 normally carrying liquid to or from the said casing 10. A flexible tube is designated at 12 and a connector element is generally designated at 13. The connector element 13 comprises a pair of laterally spaced leg members 14 suitably connected by a spring type of loop 15 whereby the said leg members 14 are placed in generally V or U-shaped configuration.

An expander element generally indicated at 16 is disposed at the ends of the leg members 14. The expander element 16 comprises, generally, a partial ring or convolute element 17 having its axis generally centrally disposed or in coaxial relation with respect to a center line extending between the leg members 14. The partial ring or convolute elements 17 is provided with looped end portions 18 which are circumferentially spaced or separated as indicated in Figure 1. Fingers 19 are connected to the looped end portions 18, the said fingers 19 extending inwardly toward the axis of the convolute element 17 and being relatively substantially in parallel spacing. The fingers 19 are suitably connected as indicated at 20 to the leg members 14.

As indicated the connector element 13 may consist of a single resilient type wire suitably welded at certain points to provide a completely integral assembly. Such welding or the manner in which the connector element may be made need not be disclosed since the art of spring making or other spring like devices the procedures is generally conventional and the connector element may be formed in a likewise manner. The loop 16 and its relation to the leg members 14 with the expander element 16 have a tendency to spread the legs 14 apart.

It is a simple matter to insert the connector 13 into the flexible tube 12 by merely deforming the normal diameter of the expander by pinching the same whereupon the gap between the fingers 19 is decreased and the legs 14 and loop 15 will thereupon cause the said expander to exert a resilient outward pressure against the inner wall of the flexible tubing thereby urging the outer wall of the same into sealing relation with respect to the bore or passage 11. By pinching the flexible tube containing the connector, it may be readily inserted into the bore. Thus, in effect the flexible member 12 is in communication and is sealed with respect to the bore 11, the expander 16 exerting a constant pressure against the flexible tube to maintain the same in the assembled condition shown in Figure 2.

In Figure 3, a modified form of the invention is shown and a connector element is generally designated by the reference character 21. The connector element 21 comprises leg elements 22 which are suitably and resiliently connected by means of a loop 23 to again form a generally V or U-shaped configuration. An expander 24 is positioned at the end of the leg elements 22, the said expander comprising a convolute element 25, or complete ring, the said element 25 having convolute portions 26 disposed on opposite sides of the convolute element 25. The convolute portions 26 have connected thereto fingers 27 and 28 extending inwardly in substantial parallel relation and the said fingers 27 and 28 are suitably connected to the ends of the leg elements 22.

In this modification, the connector element is placed in the tube in the same manner as indicated in Figure 2 and functions in a similar manner with the exception that the convolute element 25 or expander has at least one complete convolution as indicated.

In Figure 4 another modified form of the invention is shown, the connector element here being designated generally at 30. The connector element 30 comprises leg members 31 and a resilient loop 32 which has a tendency to spread the leg members 31 apart. The expander at the ends of the leg members 31 comprises a convolute member 33 having overlapping portions 34 as indicated. The overlapping portions 34 are connected to suitable fingers 35 and 36 which as indicated extend in generally cross-cross relation with respect to each other and are suitably connected to the ends of the leg members 31.

In this modification shown in Figure 4, the operation is the same as in the connector element shown in Figures 1, 2 and 3. The connector element 30 is inserted into the end of the tube and the leg members 31 and loop 32 have a tendency to expand the convolute member 33 outwardly into engagement with the inner wall of the flexible tubes so as to connect and seal the same with respect to the bore 11. It is of course, obvious that similar to the connector elements shown in Figures 1 and 2, the connector elements 21 and 30 are inserted into the end of the tube by deforming the normal diameter of the convolute elements so that after insertion they are urged outwardly into tight engagement with respect to the flexible tube.

Thus, it is believed obvious that an improved and simplified connector member, and modifications thereof, have been disclosed, the same permitting quick attachment and detachment of a flexible tube with respect to a fluid carrying bore. It must, of course, be realized that changes and modifications may be made which do not depart from the spirit of the invention as disclosed or the scope thereof as defined in the appended claim.

What is claimed is:

In combination with a fluid conducting member having a bore therethrough positioned in telescopic relation with the outer periphery of at least a portion of a flexible tube to form a passage for communicating said fluid therewithin, a resilient connector element removably disposed within said passage positioned to urge said tube in sealing relation with said member, said connector element comprising a pair of legs axially disposed in said tube extending substantially beyond said member, a resilient loop disposed in said tube beyond said member, said resilient loop being integrally connected to one end of each of said legs in expandable-contractable U-shaped relation, an expander disposed within said flexible tube and said fluid conducting member, said expander having a resiliently deformable convolute element disposed in a plane intersecting transversely said fluid conducting member and said tube, said convolute element being positioned engageably with said flexible tube in compressive relation with said fluid conducting member, said convolute element having a pair of fingers extending radially inward, and means for integrally connecting each of said fingers respectively with the other ends of said legs whereby expansion of said legs urges said convolute element of said expander to engage said flexible tube radially in compressive relation with respect to said fluid conducting member and alternately contraction of said legs urges inward deformation of said convolute element for disengaging said expander from said flexible tube.

References Cited in the file of this patent
UNITED STATES PATENTS

| | | |
|---|---|---|
| 655,688 | Coleman | Aug. 14, 1900 |
| 998,582 | Lucas | July 18, 1911 |
| 1,099,833 | White | June 9, 1914 |
| 1,668,978 | Rhinevault | May 8, 1928 |
| 2,122,925 | Bins | July 5, 1938 |
| 2,163,455 | Van Uum | June 20, 1939 |
| 2,389,635 | Place | Nov. 27, 1945 |
| 2,650,113 | Brace | Aug. 25, 1953 |